March 19, 1940.   H. VEGDAHL   2,193,952
AUTOMOBILE SIGNAL
Filed Oct. 28, 1937   2 Sheets-Sheet 1
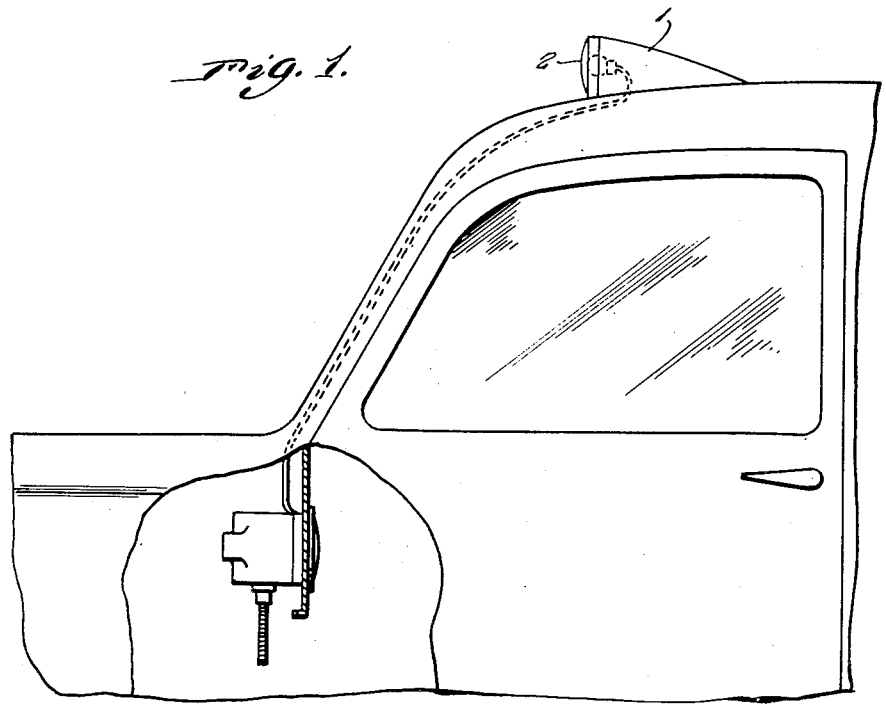
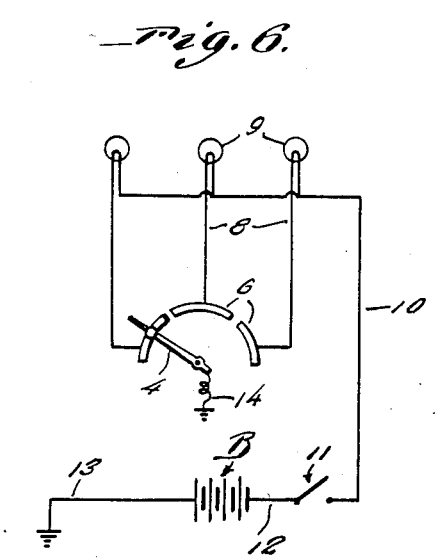
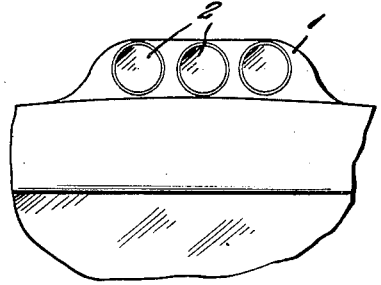
Inventor
Hilmar Vegdahl
By L. B. James
Attorney

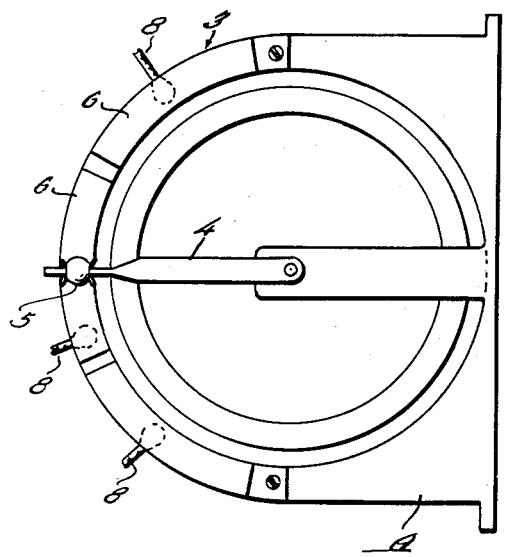
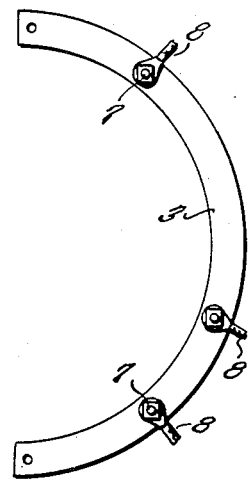
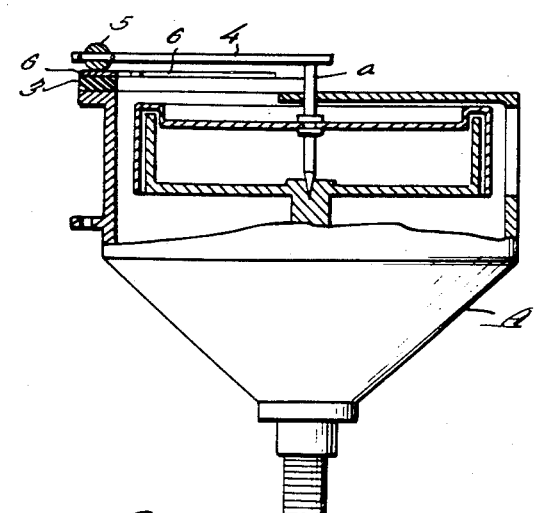
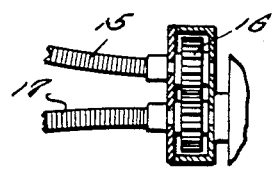

Patented Mar. 19, 1940

2,193,952

UNITED STATES PATENT OFFICE 2,193,952

AUTOMOBILE SIGNAL

Hilmar Vegdahl, New London, Minn.

Application October 28, 1937, Serial No. 171,591

1 Claim. (Cl. 200—56)

This invention relates to a signal for a motor vehicle, the general object of the invention being to provide means for indicating to the occupants of approaching vehicles, the approximate speed of the vehicle equipped with the invention.

This invention also consists in certain other features of construction, combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Fig. 1 is a fragmentary side view, with parts broken away, of a vehicle equipped with the invention.

Fig. 2 is a view of a speedometer, having the movable and stationary contacts thereon.

Fig. 3 is a view, partly in section of Fig. 2.

Fig. 4 is a view of the non-conductor strip carrying the stationary contacts and the posts for receiving the conductors.

Fig. 5 is a view of the roller carrying the finger.

Fig. 6 is a diagram of the circuits.

Fig. 7 is a fragmentary front view of the vehicle and showing the signals.

Fig. 8 is a detail sectional view showing how the device can be driven from the drive means of the regular speedometer.

In these drawings, the numeral 1 indicates a raised part on the front end of the roof of the body of the vehicle, which contains three lamp casings, the front of each of which is provided with the lens 2. I prefer to have one of these lenses blue, one clear and the other red. A semi-circular strip 3 of non-conducting material is fastened to the casing of the speedometer A and a finger 4 is connected with the rotary shaft of the speedometer. This finger carries a roller 5 which engages the strip. The strip carries three contact plates 6 which are spaced apart and each of which is connected to a post 7 which passes through the strip and has a conductor 8 fastened thereto, these conductors leading to the three lamps 9 in the three casings. A conductor 10 leads from the three lamps to a switch 11 and the switch is connected by a conductor 12 with the battery B, which is grounded as shown at 13. The finger is also grounded as shown at 14.

When the invention is installed on new cars the contact parts are applied to the speedometer of the vehicle, as shown in Figs. 1, 2, and 3. When the invention is to be installed on old cars then the shaft $a$ can be driven by a shaft located in a flexible casing 15 and the shaft connected to a gear 16 which meshes with a gear on the speedometer shaft 17, as shown in Fig. 8.

The parts are so arranged that when the vehicle is traveling at speeds of from five miles per hour to thirty miles per hour, the blue light will be on. Between thirty miles and fifty-five miles, the clear light will be on and at speeds above fifty-five miles the red light will be on. Thus approaching car drivers will know the approximate speed of the coming car and can act accordingly.

It will, of course, be understood, that as the shaft $a$ is rotated from a moving part of the vehicle, it will move the finger 4 over the strip 3, and that when the finger contacts one of the contact plates 6, the lamp which is electrically connected with this plate will be lighted. As the speed increases, the finger will pass off the first plate and then engage the next plate and then the lamp connected with this plate will be lighted and finally the finger will engage the third plate, if the speed of the vehicle continues to increase, and then the third lamp will be lighted.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

In combination with a speed indicating device of a motor vehicle having a rotatable hollow drum, a relatively thin number dial secured to the drum covering the same, an auxiliary shaft axially passing through the number dial with its inner end seated in the base of the drum and its outer end protruding therefrom, an apertured bracket on the casing of the device forming a bearing for the outer portion of the auxiliary shaft, a semi-circular strip of di-electric material secured to the outer surface of the casing of the device, a plurality of contact plates spacedly disposed on the di-electric material, a finger secured to the outer end of the auxiliary shaft and operable over the contacts, and an anti-friction electric current conductor carried at the free end of the finger and operable over the contact plates.

HILMAR VEGDAHL.